(12) United States Patent
Ozeki

(10) Patent No.: US 8,730,408 B2
(45) Date of Patent: May 20, 2014

(54) LIGHTING DEVICE, DISPLAY DEVICE, AND TELEVISION RECEIVER

(75) Inventor: Tsuyoshi Ozeki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/122,644

(22) PCT Filed: May 25, 2012

(86) PCT No.: PCT/JP2012/063459
§ 371 (c)(1),
(2), (4) Date: Nov. 26, 2013

(87) PCT Pub. No.: WO2012/165324
PCT Pub. Date: Dec. 6, 2012

(65) Prior Publication Data
US 2014/0085546 A1    Mar. 27, 2014

(30) Foreign Application Priority Data

Jun. 2, 2011    (JP) .................................. 2011-124151

(51) Int. Cl.
*H04N 5/66*       (2006.01)
*H04N 9/12*       (2006.01)

(52) U.S. Cl.
USPC ........... 348/739; 348/748; 348/744; 348/790; 348/794; 348/687; 348/330; 348/333.1; 348/68; 362/365; 362/362; 362/317; 362/382; 362/257; 362/433; 362/84; 349/70; 349/151

(58) Field of Classification Search
USPC ......... 348/739, 748, 744, 790, 794, 687, 330, 348/333.1, 68; 362/365, 362, 317, 382, 362/257, 433, 84; 349/70, 151
See application file for complete search history.

(56) References Cited

U.S. PATENT DOCUMENTS

| 6,157,421 | A | * | 12/2000 | Ishii | ............................... 349/43 |
|---|---|---|---|---|---|
| 6,320,741 | B1 | * | 11/2001 | Ohya et al. | .................... 361/502 |
| 6,418,793 | B1 | * | 7/2002 | Pechoux et al. | ................. 73/714 |
| 7,990,039 | B2 | * | 8/2011 | Matsumoto et al. | .......... 313/485 |
| 8,491,169 | B2 | * | 7/2013 | Kasai | ............................ 362/433 |
| 2002/0196096 | A1 | * | 12/2002 | Tajima | ............................ 333/26 |
| 2005/0173145 | A1 | * | 8/2005 | Ohtsuka et al. | .......... 174/35 GC |
| 2006/0033199 | A1 | * | 2/2006 | Kawakami et al. | ........... 257/700 |
| 2006/0066761 | A1 | * | 3/2006 | Tajima et al. | ................. 348/748 |

(Continued)

FOREIGN PATENT DOCUMENTS

| JP | 2007-206468 A | 8/2007 |
|---|---|---|
| JP | 2008-153217 A | 7/2008 |

(Continued)

*Primary Examiner* — Jefferey Harold
*Assistant Examiner* — Mustafizur Rahman
(74) *Attorney, Agent, or Firm* — Chen Yoshimura LLP

(57) ABSTRACT

This backlight device 12 of the present invention includes: a cold cathode fluorescent tube; a chassis 14 that houses at least the cold cathode fluorescent tube on a front surface 14a1 side of a bottom plate 14a of the chassis; and a circuit substrate 32 having a front surface 32a on which electronic components 38a and 38b are disposed, the front surface 32a facing a rear surface 14a2 of the bottom plate 14a of the chassis 14. The heat generated from the electronic components 38a and 38b circulates towards the chassis 14 with ease, and therefore the heat generated from the electronic components 38a and 38b on the circuit substrate 32 can be effectively dissipated by the bottom plate 14a of the chassis 14.

14 Claims, 5 Drawing Sheets

(56) References Cited

U.S. PATENT DOCUMENTS

| | | |
|---|---|---|
| 2007/0029566 A1* | 2/2007 | Katagami et al. ............... 257/98 |
| 2007/0056007 A1* | 3/2007 | Abe et al. ...................... 725/111 |
| 2007/0182298 A1 | 8/2007 | Kubota et al. |
| 2008/0143920 A1 | 6/2008 | Back et al. |
| 2008/0272483 A1* | 11/2008 | Oman ........................... 257/713 |
| 2009/0009692 A1* | 1/2009 | Matsumoto et al. ............ 349/70 |
| 2009/0168314 A1* | 7/2009 | Park et al. ................ 361/679.02 |
| 2009/0213546 A1* | 8/2009 | Hassani et al. ................ 361/702 |
| 2011/0103059 A1* | 5/2011 | Chen et al. ............... 362/249.02 |
| 2011/0255015 A1* | 10/2011 | Kasai ........................... 348/739 |

FOREIGN PATENT DOCUMENTS

| | | |
|---|---|---|
| JP | 2009-70569 A | 4/2009 |
| JP | 2009-199816 A | 9/2009 |
| JP | 2010-267596 A | 11/2010 |

* cited by examiner

LIGHTING DEVICE, DISPLAY DEVICE, AND TELEVISION RECEIVER

TECHNICAL FIELD

The present invention relates to an illumination device, a display device, and a television receiver.

BACKGROUND ART

In recent years, flat panel display devices that use flat panel display elements such as liquid crystal panels and plasma display panels are increasingly used as display elements for image display devices such as television receivers instead of conventional cathode-ray tube displays, allowing image display devices to be made thinner. Liquid crystal panels used in liquid crystal display devices do not emit light on their own, and therefore, it is necessary to provide a separate backlight device as an illumination device. In such backlight devices, generally, light source is housed in a chassis that functions as a case, and a circuit substrate on which a plurality of electronic components for supplying power to the light source, performing drive control on the light sources, and the like are attached to the outer side of the chassis.

Patent Document 1 discloses a backlight device including such a circuit substrate. A circuit substrate is attached to the backlight device so as to have the surface thereof opposite to where the electronic components are mounted face the chassis. The chassis additionally has attached thereto another member such as a substrate cover covering the mounting surface for the electronic components. In such a configuration, heat generated from the electronic components on the circuit substrate is transmitted towards the substrate cover facing the electronic components, and is dissipated from the other member to outside of the backlight device.

RELATED ART DOCUMENT

Patent Document

Patent Document 1: Japanese Patent Application Laid-Open Publication No. 2010-267596

Problems to be Solved by the Invention

However, in the backlight device disclosed in Patent Document 1, the substrate cover is approximately the same size as the mounting surface of the circuit substrate for the electronic components. As a result, the heat-dissipating area of the substrate cover is small, and there were cases in which heat generated by the electronic components on the circuit substrate was not dissipated to a sufficient degree.

SUMMARY OF THE INVENTION

The invention disclosed in the present specification is made in view of the problem described above. An object of the invention disclosed in the present specification is to provide an illumination device that can effectively dissipate heat generated by electronic components on the circuit substrate.

Means for Solving the Problems

The technique disclosed in the present specification relates to an illumination device, including: a light source; a housing member that has a plate-shaped member, and that houses at least the light source on a first main surface of the plate-shaped member; and a circuit substrate having electronic components disposed on one surface thereof, the circuit substrate being disposed such that the one surface faces a second main surface of the housing member.

According to the above-mentioned illumination device, the circuit substrate is disposed such that the electronic components face the bottom plate of the housing member, and thus, heat generated by the electronic components is conducted with ease towards the bottom plate of the housing member. The bottom plate of the housing member is larger than the circuit substrate, and thus, heat generated by the electronic components on the circuit substrate can be effectively dissipated by the bottom plate of the housing member.

A projection that protrudes from the second main surface of the housing member may be further included, wherein the circuit substrate is attached to the housing member through the projection.

According to this configuration, it is possible to attach the circuit substrate to the second main surface of the bottom plate with ease.

A plurality of the projections may be included.

According to this configuration, it is possible to attach the circuit substrate to the second main surface of the housing member with greater ease using the plurality of projections.

Gaskets disposed between a bottom plate of the housing member and the circuit substrate so as to be in contact with both may be further included.

According to this configuration, heat generated by the electronic components on the circuit substrate can be conducted with greater ease towards the housing member through the gaskets, thus further increasing the heat-dissipation properties.

The gaskets may be disposed between the respective plurality of projections.

According to this configuration, the dissipation of heat generated by the electronic components is towards the bottom plate through the gaskets can be further improved.

The gaskets may be electromagnetic wave-shielding gaskets.

According to this configuration, electromagnetic waves generated by the electronic components can be blocked by the gaskets, and thus, it is possible to effectively prevent or mitigate electromagnetic waves generated by the electronic components.

A space between the housing member and the circuit substrate may be surrounded by the projections and the gaskets.

According to this configuration, electromagnetic waves generated by the electronic components are trapped between the bottom plate and the circuit substrate, and thus, electromagnetic waves generated by the electronic components can be prevented or mitigated more effectively.

The electronic components may include an input/output portion having an input terminal and an output terminal, and the input/output portion may be disposed on a portion of the circuit substrate in contact with the gaskets.

According to this configuration, radiation by transmission can be mitigated.

The portion of the circuit substrate in contact with the gaskets may be grounded.

According to this configuration, a stable electrical connection can be made between the circuit substrate and the housing member.

A heat dissipation member disposed between the housing member and the circuit substrate so as to be in contact with both, and having a greater heat-dissipation property than the circuit substrate may be further included.

According to this configuration, heat generated by the electronic components can be more effectively dissipated towards the housing member through the heat-dissipation member.

The techniques disclosed in the present specification may be a display device that includes a display panel that displays images using light from the above-mentioned illumination device. A display device that uses as the display panel a liquid crystal panel that uses liquid crystal is novel and is useful. A television receiver that includes the above-mentioned display device is also novel and useful.

Effects of the Invention

According to techniques disclosed in the present specification, it is possible to provide an illumination device that can effectively dissipate heat generated by electronic components on the circuit substrate.

DETAILED DESCRIPTION OF EMBODIMENTS

Embodiment 1 will be described with reference to the drawings. Each of the drawings indicates an X axis, a Y axis, and a Z axis in a portion of the drawings, and each of the axes indicates the same direction for the respective drawings. The Y axis direction corresponds to the vertical direction and the X axis direction corresponds to the horizontal direction.

Figure 1:
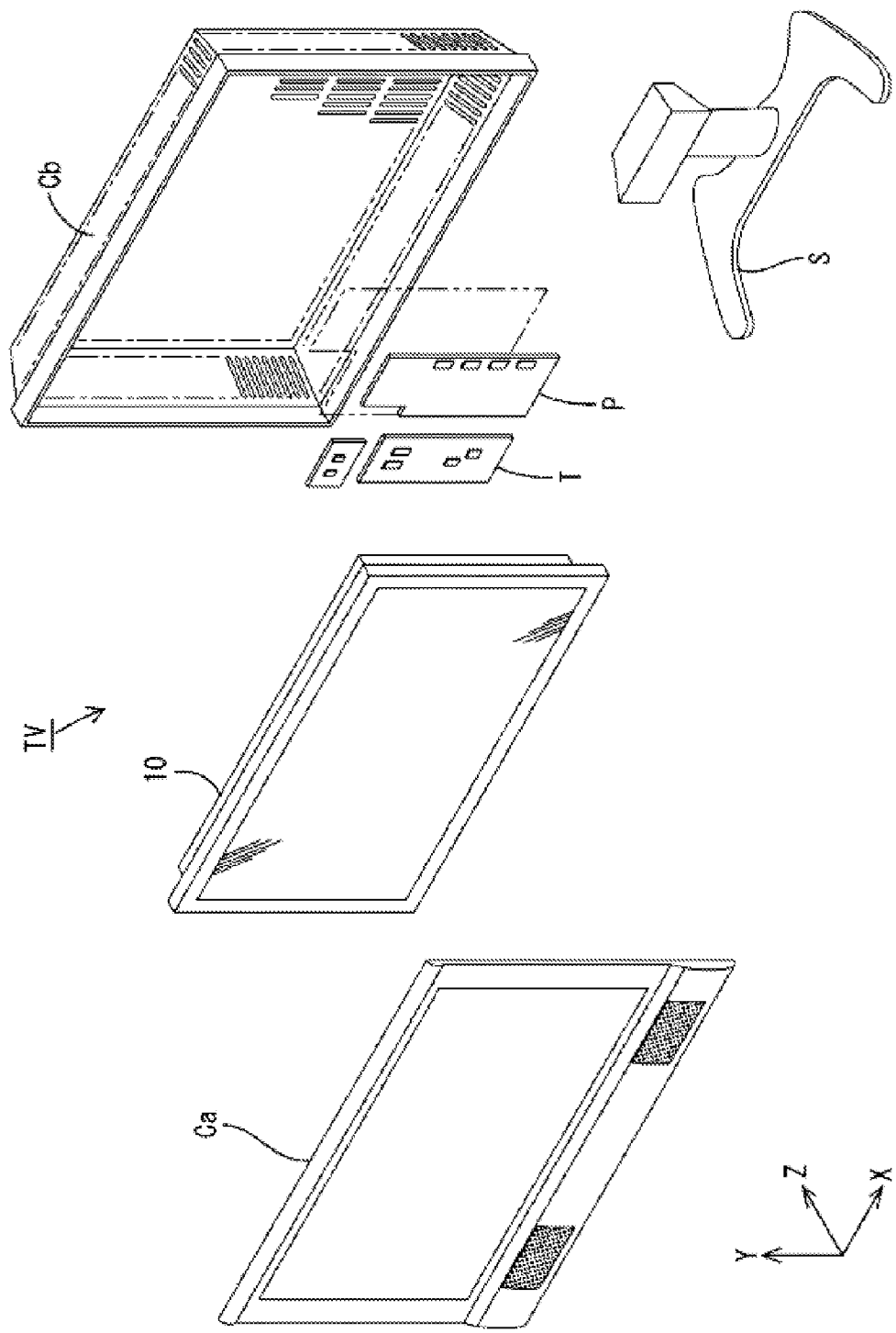
FIG. 1 is an exploded perspective view of a television receiver TV according to Embodiment 1.

FIG. 1 is an exploded perspective view of a television receiver TV according to Embodiment 1. The television receiver TV includes a liquid crystal display device 10, front and rear cabinets Ca and Cb that store the display device D therebetween, a power source P, a tuner T, and a stand S. The liquid crystal display device 10 is formed in a horizontally long rectangular shape as a whole, and is housed in a vertical orientation.

Figure 2:
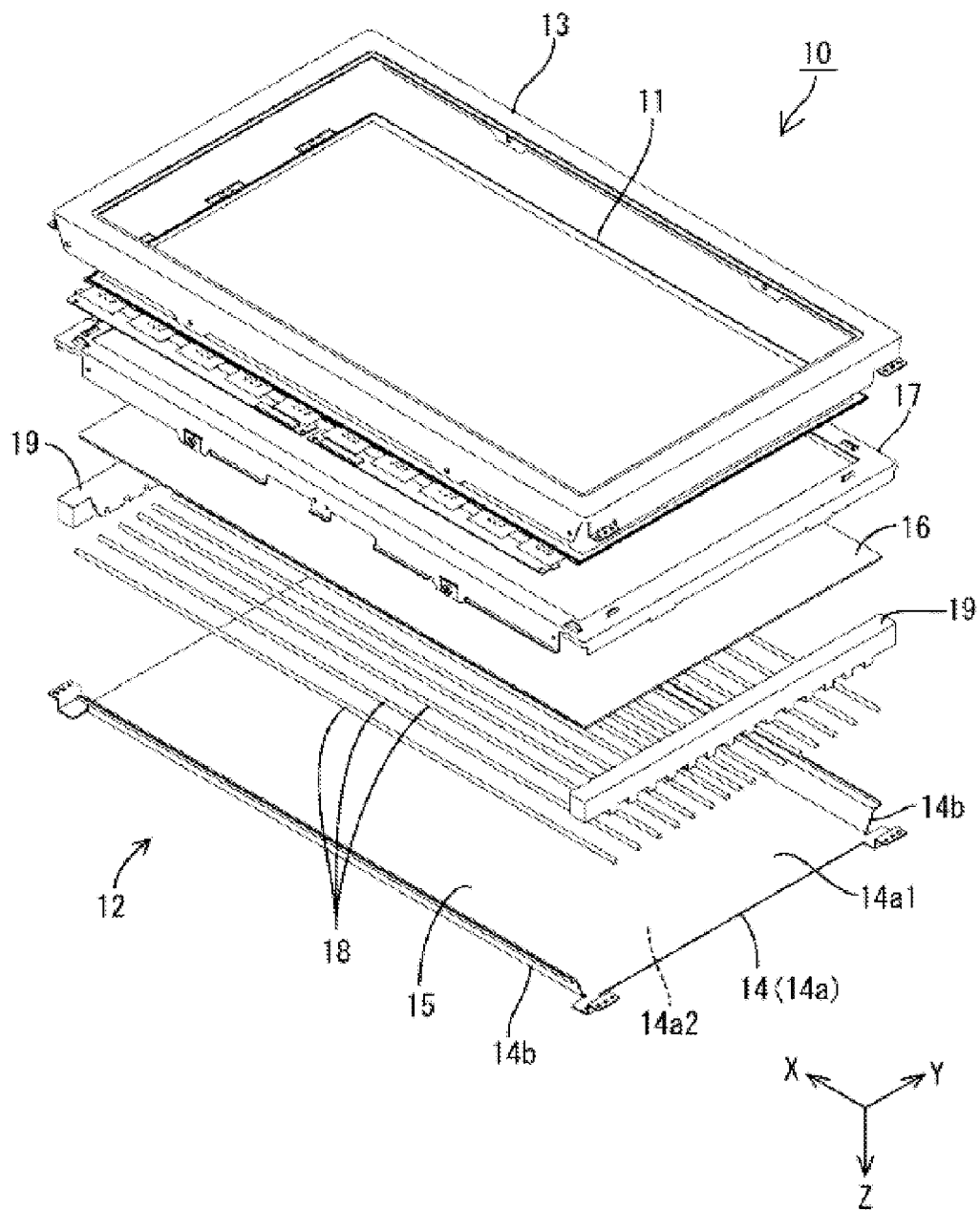
FIG. 2 is an exploded perspective view of a liquid crystal display device 10.
Figure 3:
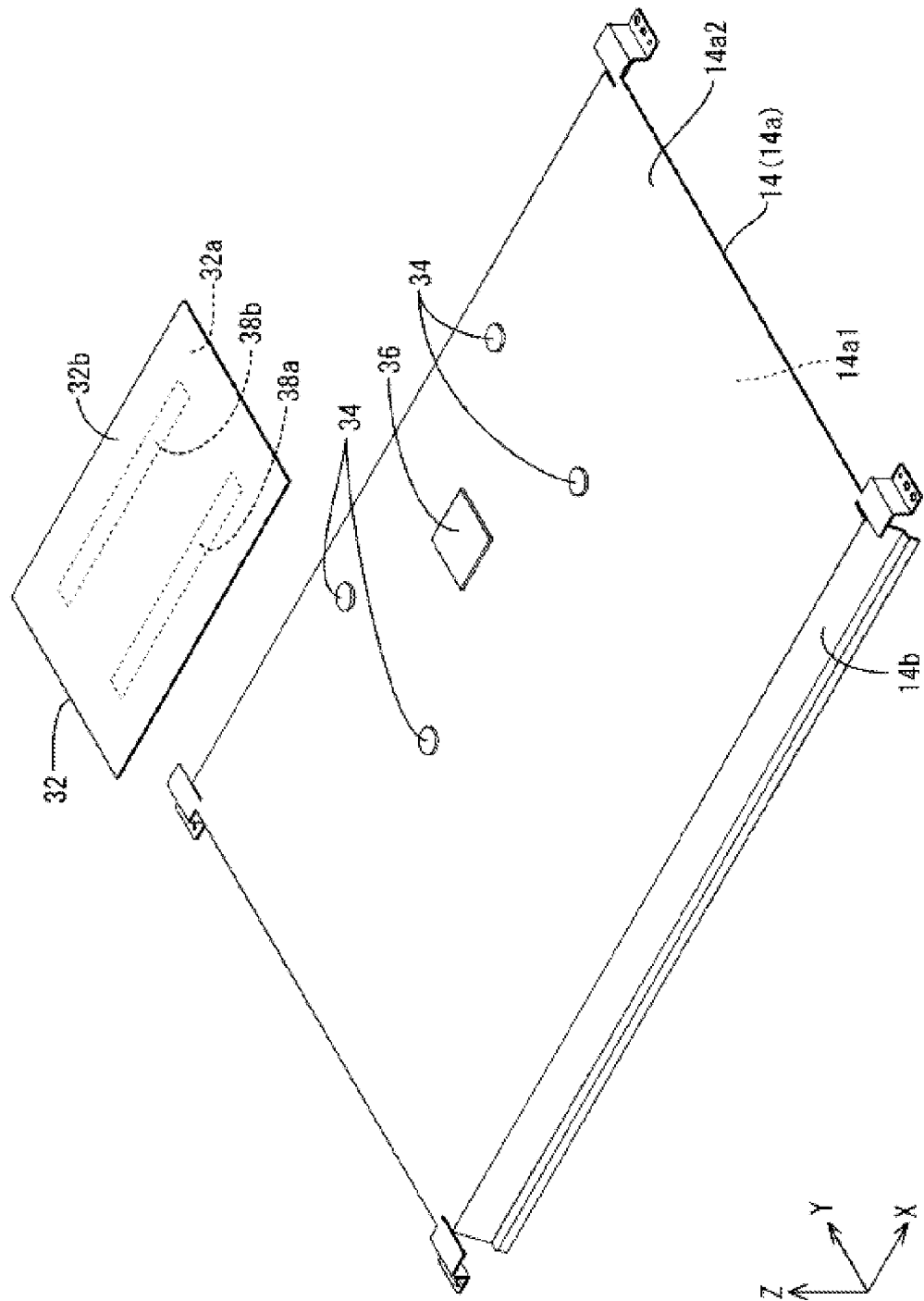
FIG. 3 is an exploded perspective view of a chassis 14 of a backlight device 12 viewed from the rear.
Figure 4:
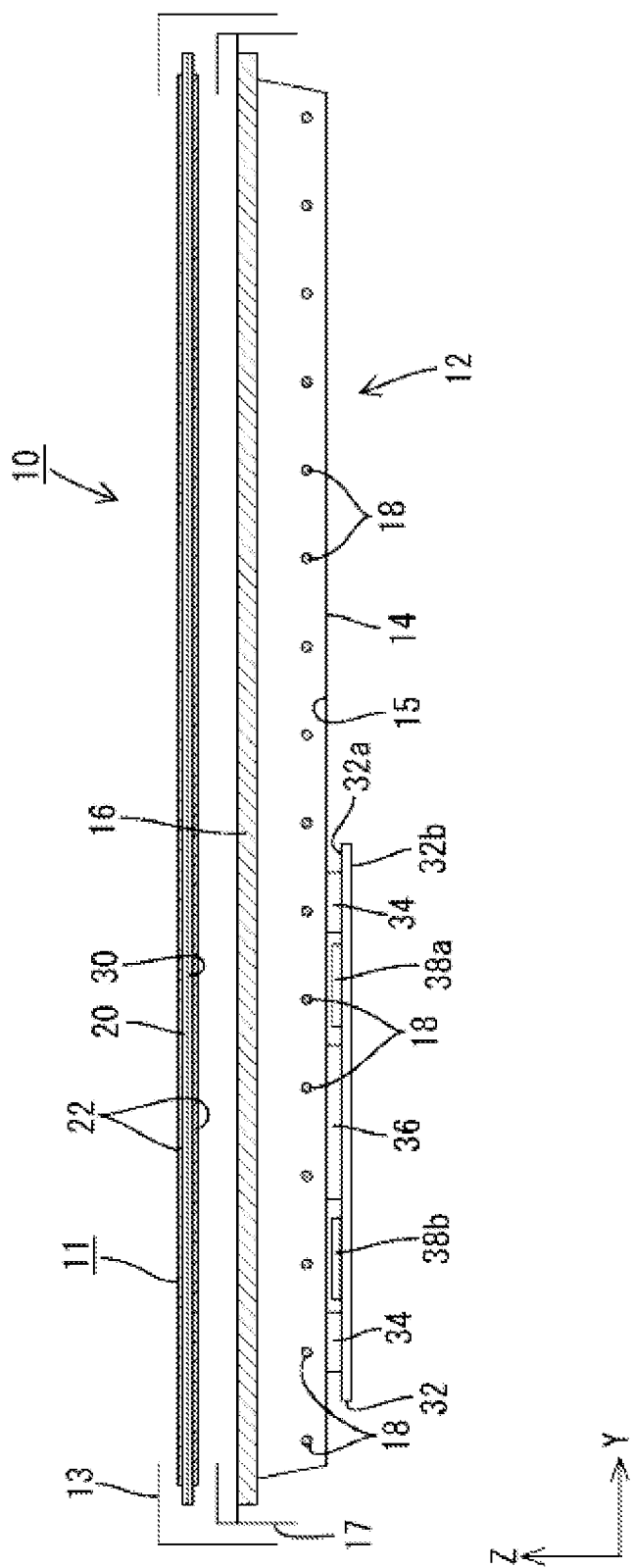
FIG. 4 is a cross-sectional view of the liquid crystal display device 10.

FIG. 2 is an exploded perspective view of the liquid crystal display device 10. FIG. 3 is an exploded perspective view of a chassis 14 of a backlight device 12 to be described below as viewed from the rear. FIG. 4 is a cross-sectional view that shows a cross-section of the liquid crystal display device 10 along the vertical direction (Y axis direction). Here, the upper side of FIGS. 2 and 4 and the lower side of FIG. 3 are the front side, and the lower side of FIGS. 2 and 4 and the upper side of FIG. 3 are the rear side. As shown in FIG. 2, the liquid crystal display device 10 includes a liquid crystal panel 11, which is a display panel, and a backlight device 12, which is an external light source, and is held together integrally with a frame-shaped bezel 13 and the like.

First, the liquid crystal panel 11 will be described. As shown in FIG. 4, the liquid crystal panel 11 includes a pair of transparent (having a high degree of transparency) glass substrates 20 and 30 bonded together with a prescribed gap therebetween, and a liquid crystal layer (not shown in drawings) sealed between the glass substrates 20 and 30. One of the glass substrates includes switching elements (TFTs, for example) connected to source lines and gate lines that intersect each other perpendicularly, pixel electrodes connected to the switching elements, an alignment film, and the like, and the other glass substrate includes color filters disposed such that respective colored portions of R (red), G (green), B (blue), and the like have a prescribed arrangement, an opposite electrode, an alignment film, and the like. Of these, the source wiring lines, the gate wiring lines, the opposite electrode, and the like are supplied with image data and various control signals necessary in order to display images from a driver circuit substrate that is not shown in drawings. A pair of polarizing plates 22 are bonded on the front and rear of the liquid crystal panel 11, respectively, on the outer surfaces of the substrates 20 and 30.

Next, the backlight device 12 will be described. As shown in FIGS. 2 and 4, the backlight device 12 is a so-called direct-lit backlight in which light sources are disposed directly below the rear surface of the liquid crystal panel 11, a chassis 14 in which the front side (towards the liquid crystal panel 11) thereof is the light-exiting side, a reflective sheet 15 laid on the inside of the chassis 14, optical member 16 attached to the light-exiting side of the chassis 14, a frame 17 having a frame-shape and supporting the optical member 16 along the inner edge, a plurality of cold cathode fluorescent tubes 18 housed in the chassis 14 aligned in parallel with each other, and lamp holders 19 that block light at the ends of the cold cathode fluorescent tubes 18, the lamp holders 19 having light-reflecting properties.

The chassis 14 is made of a metal such as an aluminum-type material, for example, and includes a bottom plate 14a that is a plate-shaped member, and side plates 14b. The bottom plate 14a is formed into a horizontally long rectangle similar to the liquid crystal panel 11, and is disposed opposite to the optical member 16 across the cold cathode fluorescent tubes 18. The side plates 14b rise up from the long side outer edges of the bottom plate 14a, and are inclined outwards from the bottom plate 14a. The standing edges of the two side plates 14b jut slightly outward, and the optical member 16 is laid onto the front side of the jutting portion. The frame 17 is screwed onto the portions of the standing edges of the side plates 14b that jut outward, and are thus fixed thereto. In the chassis 14, the long side direction thereof matches the X axis direction (horizontal direction), and the short side direction thereof matches the Y axis direction (vertical direction). A circuit substrate 32 for supplying drive power to the cold cathode fluorescent tubes 18 is disposed on the rear surface of the bottom plate 14a of the chassis 14. The circuit substrate 32 will be described in detail below.

The reflective sheet 15 is made of a resin sheet or the like having light-reflective properties, and is laid on the inner surface of the chassis 14, and has the function of reflecting light emitted from the cold cathode fluorescent tubes 18 towards the optical member 16 (light-exiting direction). On the side plates 14b of the chassis 14, the reflective sheet 15 is laid thereon so as to rise onto the side plates 14b of the chassis 14, and extends outward from the standing edges of the side plates 14b and is laid onto receiving plates 14c.

The optical member 16 is constituted of a diffusion plate 16a laid onto the receiving plate 14c of the chassis 14 with the reflective sheet 15 therebetween, and optical sheets 16b disposed on the light-exiting surface 16a3 (front side) of the diffusion plate 16a. The diffusion plate 16a is made by dispersing light-diffusion particles in a synthetic resin plate-shaped member, and has the function of diffusing light emitted from the cold cathode fluorescent tubes 18, and also has a light-reflective function to reflect light emitted from the cold cathode fluorescent tubes 18. In the state shown in FIG. 4, the rear surface of the diffusion plate 16a is a light-receiving surface 16a2 to which light from the cold cathode fluorescent tubes 18 enters, and the front surface of the diffusion plate 16a is a light-exiting surface 16a3 from which light that has entered the light-receiving surface 16a2 exits. The optical sheets 16b include a diffusion sheet, a lens sheet, and a reflective polarizing plate layered in that order from the diffusion plate 16a, and have the function of converting light emitted from the cold cathode fluorescent tubes 18 and passing through the diffusion plate 16a into planar light.

Next, the connecting state between the circuit substrate 32 and the chassis 14, and the configuration of the circuit substrate 32, which are the main portions of the present embodiment, will be described. As shown in FIG. 3, a horizontally long rectangular circuit substrate 32 is attached to the rear surface 14a2 of the bottom plate 14a of the chassis 14. The circuit substrate 32 is attached to a portion of the bottom plate 14a of through four circular plate-shaped bosses 34. The respective bosses 34 are disposed in portions corresponding to the four corners of the circuit substrate 32 to be attached to the chassis 14, and protrude from the rear surface 14a2 of the bottom plate 14a of the chassis 14. The circuit substrate 32 is attached to the chassis 14 by having the four corners of the circuit substrate 32 being attached to the respective bosses 34.

Also, as shown in FIG. 3, a heat dissipation sheet 36 having heat-dissipation properties is attached to a portion overlapping the vicinity of the center of the circuit substrate 32 attached to the chassis 14, which is the vicinity of the center of the region surrounded by the respective bosses 34 of the rear surface 14a2 of the bottom plate 14a. The heat dissipation sheet 36 has approximately the same thickness as the respective bosses 34. Thus, in a state in which the circuit substrate 32 is attached to the rear surface 14a2 of the bottom plate 14a, the heat dissipation sheet 36 is in contact with the vicinity of the center of the circuit substrate 32.

On the front surface 32a of the circuit substrate 32, a plurality of electronic components 38a and 38b for controlling the supply of power to the cold cathode fluorescent tubes 18 are mounted. The circuit substrate 32 is attached to the bottom plate 14a of the chassis 14 such that the front surface 32a of the circuit substrate 32 faces the rear surface 14a2 of the bottom plate 14a. Thus, in a state in which the circuit substrate 32 is attached to the rear surface 14a2 of the bottom plate 14a, as shown in FIG. 4, the front surface 32a of the circuit substrate 32 on which the electronic components 38a and 38b are mounted faces the front (upper side of FIG. 4), and the rear surface 32b of the circuit substrate 32 faces the rear (lower side of FIG. 4). Thus, the heat generated from the respective electronic components 38a and 38b on the circuit substrate 32 is transmitted towards the bottom plate 14a of the chassis 14, and is dissipated towards the outside of the backlight device 12 from the bottom plate 14a.

As described above, in the backlight device 12 of the present embodiment, the electronic components 38a and 38b are disposed on the circuit substrate 32 so as to face the bottom plate 14a of the chassis 14, and thus, heat generated by the electronic components 38a and 38b is easily transmitted towards the bottom plate 14a of the chassis 14. The bottom plate 14a of the chassis 14 is larger than the circuit substrate 32, and thus, it is possible to effectively dissipate heat generated by the electronic components 38a and 38b on the circuit substrate 32 by the bottom plate 14a of the chassis 14.

In a conventional configuration in which a substrate cover that covers the mounting surface side of the circuit substrate for the electronic components is attached to the chassis, an increase in manufacturing cost resulting from the addition of another member such as a substrate cover is a concern. By contrast, in the backlight device 12 of the present embodiment, there is no need to add another member such as a substrate cover, and thus, there is no increase in manufacturing cost. Also, normally, the bottom plate 14a of the chassis 14 has a larger surface area that such a substrate cover, and thus, has a higher heat-dissipating effect compared to other members such as a substrate cover. Thus, in the backlight device 12 of the present embodiment, it is possible to attain a greater heat-dissipating effect than in a conventional configuration requiring a substrate cover.

The backlight device 12 of the present embodiment further includes bosses 34 that protrude from the rear surface 14a2 of the bottom plate 14a of the chassis 14. The circuit substrate 32 is attached to the chassis 14 through the bosses 34. As a result, the circuit substrate 32 can be attached with ease to the rear surface 14a2 of the bottom plate 14a.

Also, the backlight device 12 of the present embodiment includes a plurality of bosses 34. Thus, it is possible to attach the circuit substrate 32 with greater ease onto the rear surface 14a2 of the chassis 14 as a result of the plurality of bosses 34.

Also, the backlight device 12 of the present embodiment further includes a heat dissipation sheet 36 disposed between the chassis 14 and the circuit substrate 32 and in contact with both, the heat dissipation sheet 36 having higher heat-dissipating properties than the circuit substrate 32. As a result, heat generated by the electronic components 38a and 38b can be dissipated more effectively towards the chassis 14 through the heat dissipation sheet 36.

<Embodiment 2>

Figure 5:
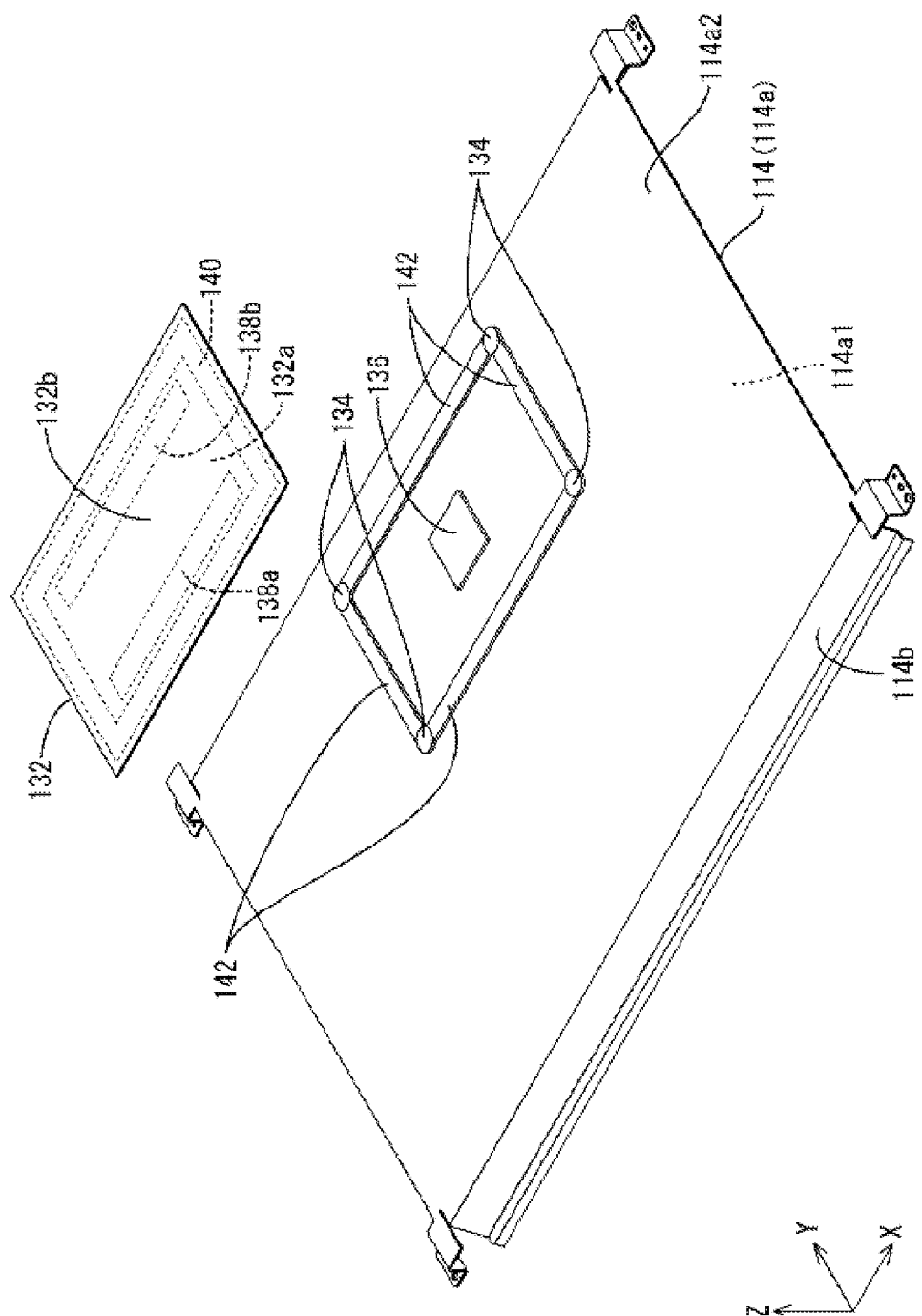
FIG. 5 is an exploded perspective view of a chassis 114 of a backlight device of Embodiment 2 viewed from the rear.

Embodiment 2 will be described with reference to the drawings. FIG. 5 is an exploded perspective view of a backlight device of Embodiment 2 viewed from a rear side of a chassis 114.

Embodiment 2 differs from Embodiment 1 in that gaskets 142 are disposed between bosses 134. Other configurations are the same as those of Embodiment 1, and therefore, descriptions of the structures, the operation, and the effect are omitted. In FIG. 5, parts where 100 has been added to reference characters from FIG. 3 are the same parts described in Embodiment 1.

In the backlight device according to Embodiment 2, as shown in FIG. 5, gaskets 142 are disposed between the respective bosses 134 that protrude from a rear surface 114a2 of the chassis 114. The gaskets 142 are electromagnetic wave-shielding gaskets, which have the function of blocking electromagnetic waves generated by electronic components 138a and 138b and the like on the circuit substrate 132. The gaskets 142 are disposed without any gaps with the four bosses 134, and have the same thickness as the respective bosses 134. As a result, in a state in which the circuit substrate 132 is attached to the rear surface 114a2 of the bottom plate 114a, the gaskets 142 are in contact with the front surface 132a of the circuit substrate 132, and the space between the chassis 114 and the circuit substrate 132 is surrounded by the bosses 134 and the gaskets 142. In other words, the front surface 132a of the circuit substrate 132 is sealed by the bosses 134, the gaskets 142, and the rear surface 114b of the bottom plate 114a. As a result, leakage towards the outside of electromagnetic waves generated by the electronic components 138a and 138b and the like on the circuit substrate 132 is prevented or mitigated in an excellent manner by the gaskets 142.

On the other hand, the portion of the surface 132a of the circuit substrate 132 in contact with the gaskets 142 is provided with an input/output portion 140 in which input terminals and output terminals of the circuit substrate 132 are disposed, and the input/output portion 140 is grounded. Thus, it is possible to have a stable electrical connection between the circuit substrate 132 and the bottom plate 114a of the chassis 114 through the gaskets 142.

As described above, in the backlight device according to Embodiment 2, gaskets that are disposed between the bottom plate 14a of the chassis 14 and the circuit substrate 132 and in contact with both are further provided. As a result, heat generated by the electronic components 138a and 138b on the circuit substrate can be transmitted with greater ease towards the chassis 114 through the gaskets 142, thus allowing the heat-dissipating properties to be further increased.

A configuration is known in which electromagnetic noise generated by the electronic components on the circuit substrate is mitigated by covering the front and rear surfaces of the circuit substrate by flexible substrates or the like, as in the technique disclosed in Japanese Patent Application Laid-Open Publication No. 2009-199816, for example, but there are cases in which flexible substrates or the like cannot be attached to the front and rear surfaces of the circuit substrate depending on the arrangement of the circuit substrate. By contrast, in the backlight device according to the present embodiment, the electronic components 138a and 138b on the circuit substrate 132 are surrounded by the gaskets 142 having the electromagnetic wave-shielding effect, and the front surface 132a of the circuit substrate 132 is sealed between the chassis 114 and the bottom plate 114a, and thus, noise generated by electromagnetic waves can be prevented or mitigated in an excellent manner without attaching another member such as a flexible substrate.

In the backlight device of Embodiment 2, the gaskets 142 are respectively disposed between the bosses 134. As a result, heat generated by the electronic components 138a and 138b can be more effectively dissipated towards the bottom plate 114a by the gaskets 142.

Also, in the backlight device of Embodiment 2, the gaskets 142 are electromagnetic wave-shielding gaskets. Thus, electromagnetic waves generated by the electronic components 138a and 138b are blocked by the gasket 142, and thus, leakage of electromagnetic waves generated by the electronic components 138a and 138b is effectively prevented or mitigated.

Also, in the backlight device of Embodiment 2, the space between the chassis 114 and the circuit substrate 132 is surrounded by the bosses 134 and the gaskets 142. As a result, electromagnetic waves generated by the electronic components 138a and 138b are trapped between the bottom plate 114a and the circuit substrate 132, and thus, leakage of electromagnetic waves generated by the electronic components 138a and 138b is more effectively prevented or mitigated.

In the backlight device of Embodiment 2, the electronic components 138a and 138b include an input/output portion 140 having input terminals and output terminals. The input/output portion 140 is disposed in a portion of the circuit substrate 132 in contact with the gaskets 142. Thus, radiation by transmission can be effectively mitigated.

Also, in the backlight device 112 of Embodiment 2, the portion of the circuit substrate 132 in contact with the gaskets 142 is grounded. Thus, a stable electrical connection can be made between the circuit substrate 132 and the chassis 114.

The corresponding relation between the configurations of each embodiment and the configurations of the present invention will be described. The cold cathode fluorescent tubes 18 are an example of the "light source." The chassis 14 and 114 are an example of the "housing member." Also, the bottom plates 14a and 114a (of the chassis) are an example of the "plate-shaped member." The front surfaces 14a1 and 114a1 (of the chassis) are an example of the "first main surface." The rear surfaces 14b2 and 114b2 (of the chassis) are an example of the "second main surface." The front surfaces 32a and 132a (of the circuit substrates) are an example of the "one surface." The backlight device 12 is an example of the "illumination device." The bosses 34 and 134 are an example of the "projections." The liquid crystal display device 10 is an example of the "display device."

Modification examples of the respective embodiments above will be described below.

(1) In the respective embodiments above, examples were described in which the circuit substrate is supported by four bosses protruding from the rear surface of the chassis, but the supporting configuration for the circuit substrates on the rear surface of the chassis is not limited thereto.

(2) In the respective embodiments above, examples were described in which one heat dissipation sheet is interposed between the circuit substrate and the bottom plate of the chassis, but a plurality of heat dissipation sheets may be disposed, or a configuration in which no heat dissipation sheet is disposed may be used.

(3) In the respective embodiments above, examples were described in which the mounting surface for the electronic components of the circuit substrate for supplying electrical power to the light source faces the bottom plate of the chassis, but if the light source is LEDs, for example, then a light-adjusting circuit substrate for controlling the amount of light emitted from the LEDs may have a mounting surface for electronic components face the bottom plate of the chassis, and other circuit substrates may similarly have the mounting surface thereof for the electronic components face the bottom plate of the chassis.

(4) In the respective embodiments above, examples in which cold cathode fluorescent tubes were used as the light source were described, but a configuration in which LEDs are used as the light source may be used.

(5) In the respective embodiments above, examples were described of the backlight device being direct-lit, but the backlight device may be edge-lit, or another type of backlight device may be used.

(6) Besides what was described in the respective embodiments above, the configuration of the circuit substrate and the connective state between the circuit substrate and the chassis can be modified as appropriate.

(7) In the respective embodiments above, a liquid crystal display device using a liquid crystal panel as a display panel was described as an example, but the present invention is applicable to a display device that uses another type of display panel.

(8) In the respective embodiments above, a television receiver that includes a tuner was described as an example, but the present invention is also applicable to a display device without a tuner.

Embodiments of the present invention were described above in detail, but these are merely examples, and do not limit the scope defined by the claims. The technical scope defined by the claims includes various modifications of the specific examples described above.

Also, the technical elements described in the present specification or shown in the drawings realize technical utility each on their own or through a combination of various technical elements, and are not limited to the combinations defined by the claims at the time of filing. Also, the techniques described in the present specification or shown in the drawings can accomplish a plurality of objects simultaneously, and each one of the objects on its own has technical utility.

DESCRIPTION OF REFERENCE CHARACTERS

TV television receiver
Ca, Cb cabinet

T tuner
S stand
10 liquid crystal display device
11 liquid crystal panel
12 backlight device
13 bezel
14, 114 chassis
14a, 114a bottom plate
14a1, 114a1 front surface (of bottom plate)
14a2, 114a2 rear surface (of bottom plate)
16 optical member
17 frame
18 cold cathode fluorescent tube
19 lamp holder
20, 30 glass substrate
22 polarizing plate
32, 132 circuit substrate
34, 134 boss
36, 136 heat dissipation sheet
38a, 38b, 138a, 138b electronic component
140 input/output portion
142 gasket

The invention claimed is:

1. An illumination device, comprising:
a light source;
a housing member that has a plate-shaped member, and that houses at least the light source on a first main surface of the plate-shaped member;
a circuit substrate having electronic components disposed on one surface thereof, the circuit substrate being disposed such that said one surface faces a second main surface of the housing member; and
a heat dissipation member disposed between the housing member and the circuit substrate so as to be in contact with both, and having a greater heat-dissipation property than the circuit substrate.

2. The illumination device according to claim 1, wherein the housing member has a projection that protrudes from the second main surface thereof, and
wherein the circuit substrate is attached to the housing member through the projection.

3. The illumination device according to claim 2, wherein the housing member includes a plurality of said projections.

4. The illumination device according to claim 3, further comprising gaskets disposed between a bottom plate of the housing member and the circuit substrate so as to be in contact with both.

5. The illumination device according to claim 4, wherein the gaskets are disposed between the respective plurality of projections.

6. The illumination device according to claim 4, wherein the gaskets are electromagnetic wave-shielding gaskets.

7. The illumination device according to claim 6, wherein a space between the housing member and the circuit substrate is surrounded by the projections and the gaskets.

8. The illumination device according to claim 4,
wherein the electronic components include an input/output portion having an input terminal and an output terminal, and
wherein the input/output portion is disposed on a portion of the circuit substrate in contact with the gaskets.

9. The illumination device according to claim 4, wherein a portion of the circuit substrate in contact with the gaskets is grounded.

10. A display device, comprising a display panel that performs display using light from the illumination device according to claim 1.

11. The display device according to claim 10, wherein the display panel is a liquid crystal panel using liquid crystal.

12. A television receiver, comprising the display device according to claim 10.

13. An illumination device, comprising:
a light source;
a housing member that has a plate-shaped member, and that houses at least the light source on a first main surface of the plate-shaped member; and
a circuit substrate having electronic components disposed on one surface thereof, the circuit substrate being disposed such that said one surface faces a second main surface of the housing member,
wherein the housing member has a plurality of projections that protrude from the second main surface thereof,
wherein the circuit substrate is attached to the housing member through the plurality of projections,
wherein gaskets that are electromagnetic wave-shielding gaskets are disposed between a bottom plate of the housing member and the circuit substrate so as to be in contact with both,
wherein the gaskets are disposed between the respective plurality of projections, and
wherein a space between the housing member and the circuit substrate is surrounded by the projections and the gaskets.

14. The illumination device according to claim 1,
wherein the housing member has a plurality of projections that protrude from the second main surface thereof,
wherein the circuit substrate is attached to the housing member through the plurality of projections,
wherein gaskets that are electromagnetic wave-shielding gaskets are disposed between a bottom plate of the housing member and the circuit substrate so as to be in contact with both,
wherein the gaskets are disposed between the respective plurality of projections, and
wherein a space between the housing member and the circuit substrate is surrounded by the projections and the gaskets.

* * * * *